US011850626B2

(12) United States Patent
Lee et al.

(10) Patent No.: US 11,850,626 B2
(45) Date of Patent: Dec. 26, 2023

(54) DIE FOR COATING INSULATING LIQUID AND METHOD FOR COATING INSULATING LIQUID

(71) Applicant: LG Energy Solution, Ltd., Seoul (KR)

(72) Inventors: Chang Hun Lee, Daejeon (KR); Seong Wook Hong, Daejeon (KR); Dong Hun Song, Deajeon (KR); Byoung Hoon Ahn, Daejeon (KR); Chae Gyu Lee, Daejeon (KR); Sang Hoon Choy, Daejeon (KR); Shin Wook Jeon, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/502,814

(22) Filed: Oct. 15, 2021

(65) Prior Publication Data

US 2022/0134379 A1    May 5, 2022

(30) Foreign Application Priority Data

Oct. 30, 2020  (KR) .......................... 10-2020-0142767

(51) Int. Cl.
*B05C 5/02*  (2006.01)
*B05D 1/26*  (2006.01)
*H01M 4/04*  (2006.01)

(52) U.S. Cl.
CPC .............. *B05C 5/0254* (2013.01); *B05D 1/26* (2013.01); *H01M 4/0402* (2013.01)

(58) Field of Classification Search
USPC ..... 118/410, 419, 420; 427/430.1, 434.2, 58
See application file for complete search history.

(56) References Cited

U.S. PATENT DOCUMENTS

2003/0140849 A1   7/2003  Kawabe
2017/0309887 A1  10/2017  Hirai et al.
2019/0232328 A1*  8/2019  Hatanaka ............. B05D 3/0272

FOREIGN PATENT DOCUMENTS

CN   107078271 A   8/2017
CN   110102448 A   8/2019
JP   H09131559 A   5/1997
(Continued)

OTHER PUBLICATIONS

English Translation JP-2004-216298 (Year: 2004).*
English Translation WO2020/066229A1 (Year: 2020).*

*Primary Examiner* — Yewebdar T Tadesse
(74) *Attorney, Agent, or Firm* — Lerner David LLP

(57) ABSTRACT

A die for coating an insulating liquid may include a die body configured to be positioned on a current collector with a certain space and discharge an insulating liquid; and a discharge portion configured to be formed on one surface where the insulating liquid of the die body is discharged, and form a discharge path and a discharge port where the insulating liquid is discharged, wherein the discharge portion includes a first discharge portion positioned at a front region side of a coating direction of the insulating liquid, and a second discharge portion positioned at a rear region side of the coating direction of the insulating liquid, an insulating liquid discharge path is formed between the first discharge portion and the second discharge portion, and an insulating liquid discharge port is formed between an end of the first discharge portion and an end of the second discharge portion.

13 Claims, 9 Drawing Sheets

(56) References Cited

FOREIGN PATENT DOCUMENTS

| | | | |
|---|---|---|---|
| JP | 2790440 | B2 | 8/1998 |
| JP | 3162026 | B2 | 4/2001 |
| JP | 2003010762 | A | 1/2003 |
| JP | 2004216298 | A * | 8/2004 |
| JP | 4163876 | B2 | 10/2008 |
| JP | 4600741 | B2 | 12/2010 |
| JP | 2012216375 | A | 11/2012 |
| JP | 5220667 | B2 | 6/2013 |
| JP | 5441968 | B2 | 3/2014 |
| JP | 2014-096302 | A | 5/2014 |
| JP | 5564975 | B2 | 8/2014 |
| KR | 100670487 | B1 | 1/2007 |
| KR | 20120108484 | A | 10/2012 |
| WO | 2019/232328 | A1 | 12/2019 |
| WO | WO-2020066229 | A1 * | 4/2020 |

* cited by examiner

[FIG. 1]
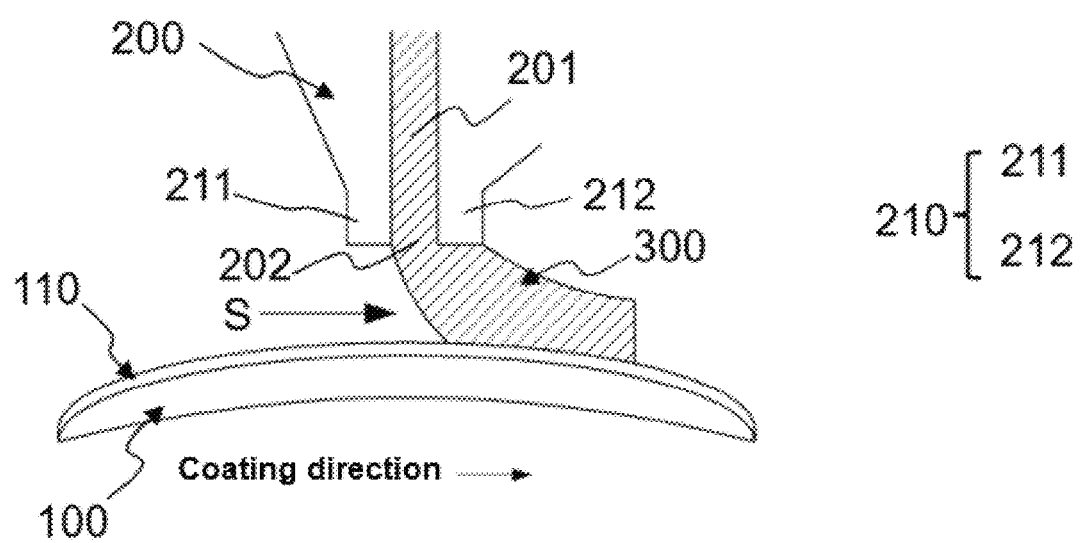

[FIG. 2]
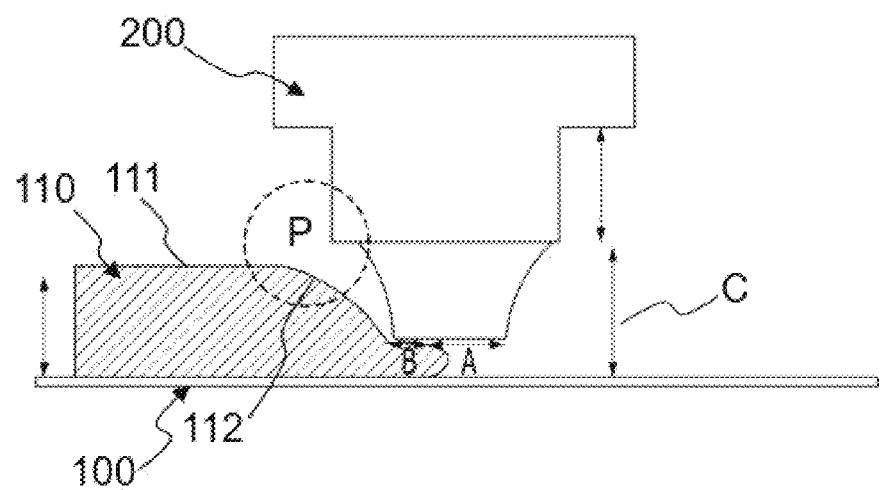

[FIG. 3]
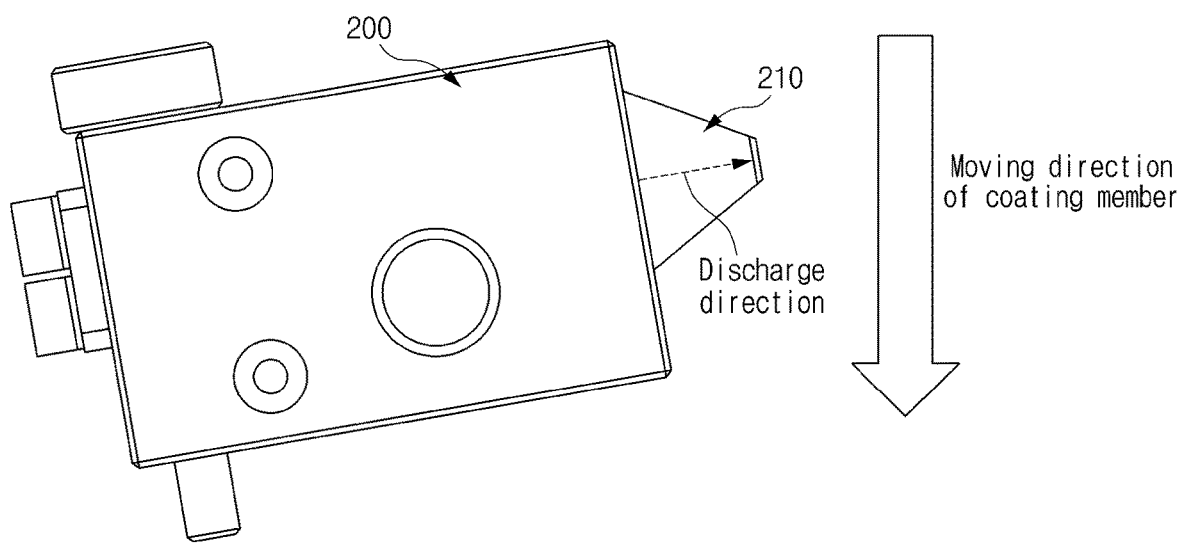

[FIG. 4]
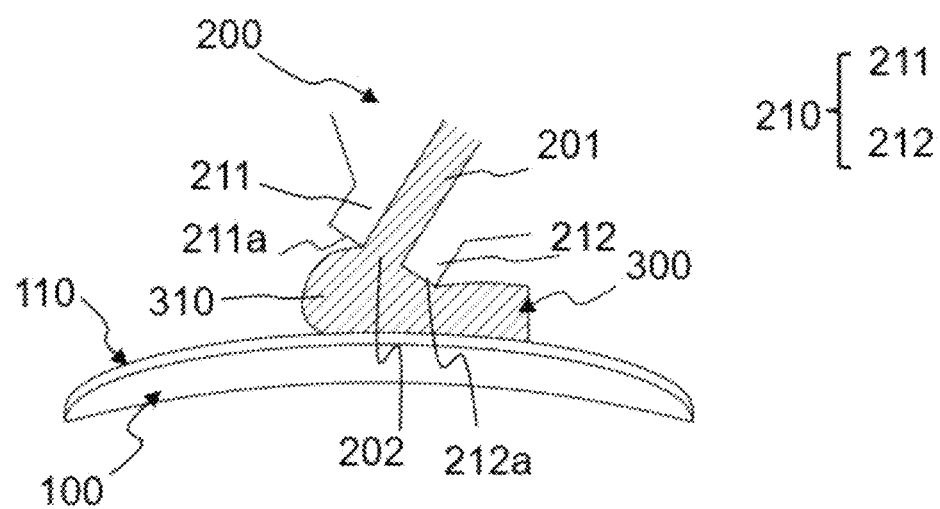

[FIG. 5]
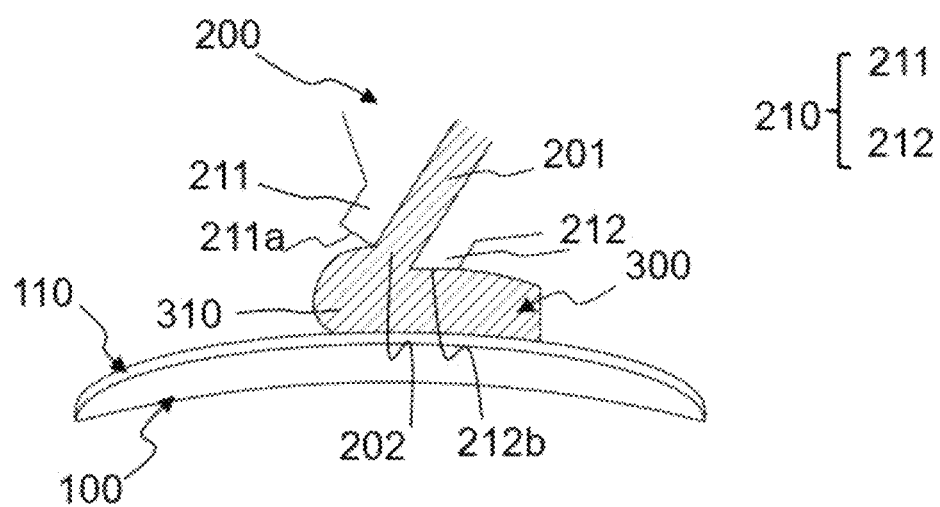

[FIG. 6]
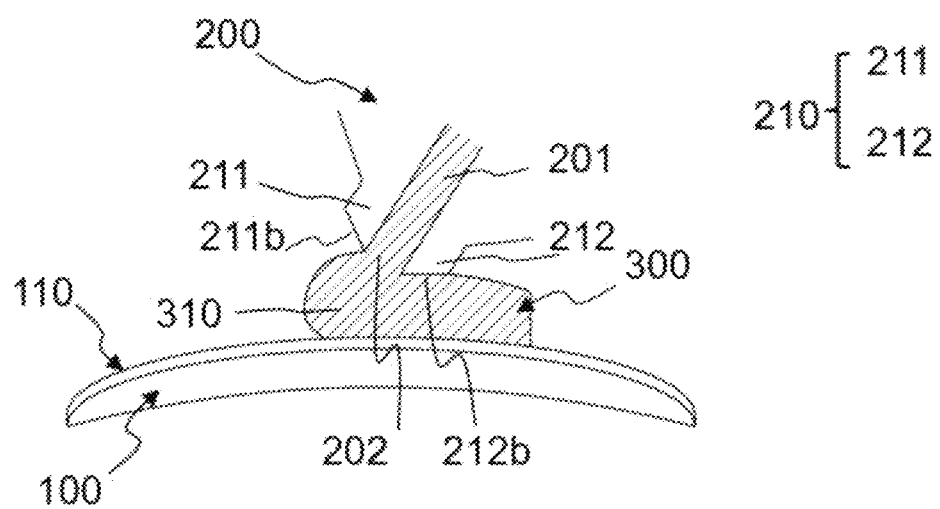

[FIG. 7]
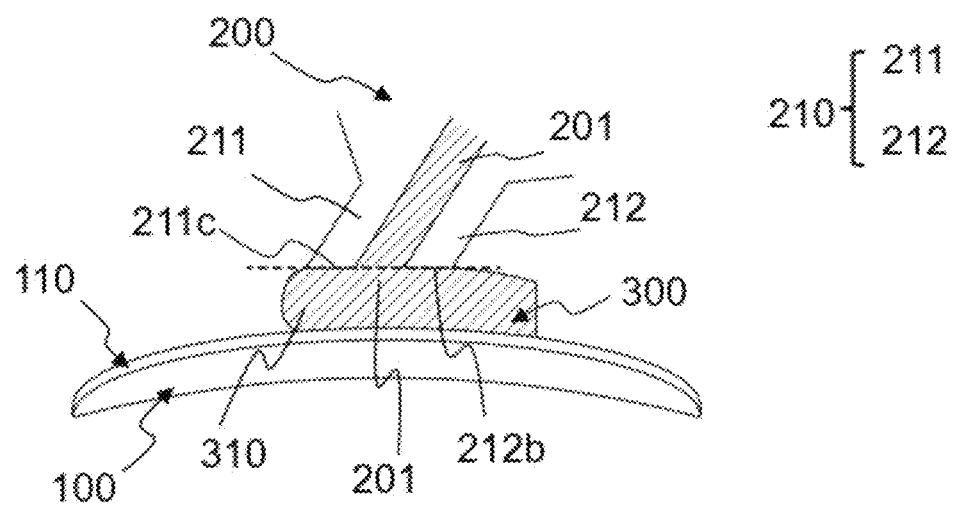

[FIG. 8]
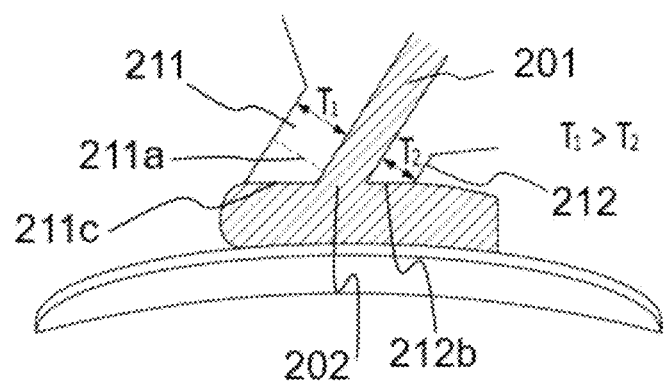

[FIG. 9]
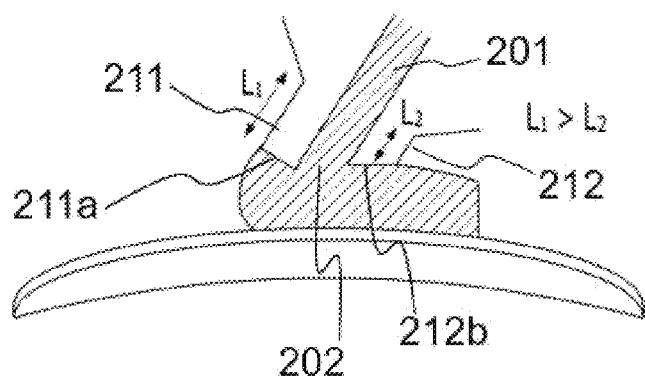

DIE FOR COATING INSULATING LIQUID AND METHOD FOR COATING INSULATING LIQUID

CROSS-REFERENCE TO RELATED APPLICATIONS

This application claims priority to Korean Patent Application No. 10-2020-0142767, filed on Oct. 30, 2020, the entire contents of which are hereby incorporated by reference herein.

TECHNICAL FIELD

The present invention relates to a die for coating an insulating liquid, and more particularly, to a die for coating an insulating liquid capable of coating the insulating liquid on an active material layer formed on a current collector. The present invention also relates to a method of coating an insulating liquid using the die for coating the insulating liquid.

BACKGROUND OF THE INVENTION

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

One of the major research tasks in these secondary batteries is to improve safety. Battery safety related accidents are closely related with abnormal high temperature conditions due to a short circuit between a positive electrode and a negative electrode. Namely, in a normal situation, a separator is positioned between a positive electrode and a negative electrode, to thereby maintain electrical insulation, but in an abnormal situation where a battery causes overcharge or overdischarge, an internal short circuit occurs due to dendritic growth of an electrode material, or a foreign material, a sharp object such as nail, screws, etc. penetrates a battery, or a battery is deformed by external force, the existing separator is not sufficient.

Further, the separator, which is mainly formed of a microporous membrane made of a polyolefin resin, has a heat resistance temperature of about 120 to 160° C., which is not a sufficient heat resistance. Hence, when an internal short circuit occurs, the separator shrinks due to the short circuit reaction heat and the short circuit occurs in a larger area, which leads to a thermal runaway state where more reaction heat is generated.

Hence, in order to reduce the possibility of a short circuit of the positive electrode and the negative electrode by maintaining the insulation of the battery electrode, an insulating liquid is generally coated on the portion of the positive electrode.

FIG. 1 is a schematic diagram showing a conventional insulating liquid coating process. As illustrated, as a current collector 100, on which an electrode active material layer 110 (electrode slurry) has been coated, is moved from the left to the right, an insulating liquid 300 is coated on the active material layer. Namely, the direction heading from the left to the right side becomes the moving direction of the current collector 100 or the moving direction of the insulating liquid coating. The current collector 100 and the active material layer 110 are illustrated to have a slight curvature for the convenience of the illustrated, but they are almost a flat surface and move from the left to the right side.

An insulating liquid coating die 200 is located on the current collector 100 at regular intervals. A discharge portion 210 for discharging an insulating liquid is installed on the lower portion of the insulating liquid coating die 200. The discharge portion 210 includes a first discharge portion 211 which is located at the front region side of the coating direction and a second discharge portion 212 which is located at the rear region side of the coating direction. The insulating liquid is discharged from a discharge path 201 formed between the first and second discharge portions and a discharge port 202 formed between the first and second discharge portions, to thereby allow the insulating liquid to be coated.

Since the insulating liquid 300 has a relatively high viscosity, the insulating liquid 300 discharged from the discharge port 202 has a form that is stretched along the coating direction. Namely, the insulating liquid 300 is coated in a form that the tail of the insulating liquid 300 is stretched by the force in the direction in which the current collector 100 is moved. By this force, the insulating liquid at the lower portion of the first discharge portion 211, which is discharged for the first time, is pulled to the right side so that an empty space (S) is formed at the lower portion of the first discharge portion 211. When such an empty space (S) is generated, air flows into this space, so that when the insulating liquid is coated, bubbles are generated.

Recently, in order to increase productivity, the coating speed of the electrode slurry increases, and thus the insulating liquid coating speed also increases. Likewise, when the coating speed increases, the possibility that such an empty space is generated further increases. Hence, when coating an insulating liquid, it is important to reduce the generation of bubbles.

FIG. 2 is a diagram of an example of a conventional insulating liquid coating die for coating an insulating liquid on an electrode coating portion. FIG. 2 illustrates a mechanism for reducing the distance between the insulating liquid coating die 200 and the current collector 100 in order to block generation of bubbles by reducing an empty space at the lower portion of the insulating liquid coating die 200. When the insulating liquid coating die 200 descends toward the current collector 100, the distance C indicated in the drawing is reduced, which may also reduce the size of the empty space S of FIG. 1.

However, in this case, two problems arise. First, there is a limit in lowering the insulating liquid coating die toward the current collector in order to secure a suitable coating gap or an appropriate coating thickness.

Second, when the coating die descends, the end P at the left side of the coating die may come in contact with the electrode coating portion due to the structure of the insulating liquid coating die. As shown in the dotted circle of FIG. 2, the electrode coating portion 110 forms a flat coating surface on electrode current collector 100, and a slope is formed toward the end of the flat coating surface and the height of the electrode coating portion 110 is lowered. If the insulating liquid coating die 200 is lowered, the inclined portion 112 of the electrode coating portion comes in contact with the left end P of the coating die, which causes a crack or a line defect on the electrode coating portion 110.

As such, there is a need for a technology for coating an insulating liquid capable of effectively preventing bubbles from being mixed with the insulating liquid while not damaging the electrode coating portion.

BRIEF SUMMARY OF THE INVENTION

Technical Problem

The present invention has been made to solve the above problems, and an object of the present invention is to provide an insulating liquid coating die capable of preventing generation of bubbles by restricting a space where air may be mixed when coating an insulating liquid on an electrode active material layer formed on a current collector.

Further, another object of the present invention is to provide a method of coating an insulating liquid capable of efficiently coating the insulating liquid by the insulating liquid coating die.

Technical Solution

A die for coating an insulating liquid for solving the above problems includes: a die body configured to be positioned on a current collector with a certain space and discharge an insulating liquid; and a discharge portion configured to be formed on one surface where the insulating liquid of the die body is discharged, and form a discharge path and a discharge port where the insulating liquid is discharged, wherein the discharge portion includes a first discharge portion positioned at a front region side of a coating direction of the insulating liquid, and a second discharge portion positioned at a rear region side of the coating direction of the insulating liquid, an insulating liquid discharge path is formed between the first discharge portion and the second discharge portion, and an insulating liquid discharge port is formed between an end of the first discharge portion and an end of the second discharge portion, and wherein the discharge portion is arranged to be tilted at a predetermined angle toward the front region side of the coating direction of the insulating liquid.

In one example, a cross-section of the second discharge portion may form an inclined surface which is tilted downwards from an end of an insulating liquid discharge port of the second discharge portion.

Specifically, a tilt angle of the inclined surface of the cross-section of the second discharge portion may be set such that an upper surface of the current collector is parallel to the inclined surface in a state that the discharge portion is tilted at a predetermined angle.

In another example, a cross-section of the first discharge portion may form an inclined surface which is tilted downwards from an end of an insulating liquid discharge port of the first discharge portion.

In another example, a cross-section of the first discharge portion may form an inclined surface which is tilted upwards from an end of an insulating liquid discharge port of the first discharge portion.

In a specific example, a tilt angle of the inclined surface of the cross-section of the first discharge portion and a tilt angle of the inclined surface of the cross-section of the second discharge portion may be set to be parallel to the upper surface of the current collector, respectively, in a state that the discharge portion is tilted at a predetermined angle.

In another embodiment of the present invention, a width of the first discharge portion may be set to be greater than a width of the second discharge portion.

In further another embodiment of the present invention, a length of the first discharge portion may be set to be greater than a length of the second discharge portion.

Specifically, the discharge portion may be arranged to be tilted by 5 to 40 degrees toward the front region side of the coating direction of the insulating liquid with respect to a direction perpendicular to the current collector.

A method of coating an insulating liquid on an electrode active material layer formed on a current collector according to the present invention includes: a step of arranging an electrode slurry coating die at a front region side in a coating direction of the insulating liquid of the current collector; a step of arranging the insulating liquid coating die at a rear region side of the electrode slurry coating die so that a discharge portion, in which the insulating liquid of the insulating liquid coating die is discharged, is to be tilted at a predetermined angle toward the front region side of the coating direction of the insulating liquid; and a step of coating the insulating liquid by moving the current collector toward the coating direction of the insulating liquid, wherein as the current collector is moved, the insulating liquid is continuously coated by the insulating liquid coating die at regular intervals after a process of coating the electrode slurry by the electrode slurry coating die at a front region side.

Specifically, the insulating liquid may be coated along an interface between a coated portion and a non-coated portion of the electrode slurry on the current collector.

Advantageous Effects

According to the present invention, it is possible to efficiently prevent generation of bubbles at the time of coating an insulating liquid by restricting generation of a space which may be generated by viscosity of the insulating liquid at the time of coating the insulating liquid.

BRIEF DESCRIPTION OF THE DRAWINGS

FIG. 1 is a schematic diagram showing a conventional insulating liquid coating process.

FIG. 2 is a diagram of an example of a conventional insulating liquid coating die for coating an insulating liquid on an electrode coating portion.

FIG. 3 is a diagram of an insulating liquid coating die according to one embodiment of the present invention.

FIG. 4 is a schematic diagram illustrating an insulating liquid application process according to the insulating liquid coating die of FIG. 3.

FIG. 5 is a schematic diagram illustrating an insulating liquid application process according to another embodiment of the present invention.

FIG. 6 is a schematic diagram illustrating an insulating liquid application process according to a modified embodiment of the embodiment of FIG. 5.

FIG. 7 is a schematic diagram illustrating an insulating liquid application process according to another modified embodiment of the embodiment of FIG. 5.

FIG. 8 is a diagram of an insulating liquid coating die according to another embodiment of the present invention.

FIG. 9 is a diagram of an insulating liquid coating die according to another embodiment of the present invention.

DETAILED DESCRIPTION

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

A die for coating an insulating liquid of the present invention includes: a die body configured to be positioned on a current collector with a certain space and discharge an insulating liquid; and a discharge portion configured to be formed on one surface where the insulating liquid of the die body is discharged, and form a discharge path and a discharge port where the insulating liquid is discharged, wherein the discharge portion includes a first discharge portion positioned at a front region side of a coating direction of the insulating liquid, and a second discharge portion positioned at a rear region side of the coating direction of the insulating liquid, an insulating liquid discharge path is formed between the first discharge portion and the second discharge portion, and an insulating liquid discharge port is formed between an end of the first discharge portion and an end of the second discharge portion, and wherein the discharge portion is arranged to be tilted at a predetermined angle toward the front region side of the coating direction of the insulating liquid.

In the present specification, "insulating liquid coating direction" refers to a direction in which a coating target is moving with respect to the coating die. In the present invention, the coating target is a current collector or an electrode active material layer on a current collector. The coating may be performed in a state that the current collector is moving and the coating die is fixed, may also be performed in a state that the coating die is moving and the current collector is moving, or may be performed in a state that the current collector and the coating die are moving toward each other. In any case, the current collector is moved with respect to the coating die. Hence, in the present specification, the coating direction of the insulating liquid is defined as a direction in which the current collector, which is a coating target or a coating member, is moving with respect to the coating die regardless of whether the coating die is moving.

Further, the front region in the coating direction of the insulating liquid refers to a current collector side where the coating has not been performed, and the rear region refers to a current collector side where the coating has been performed.

Further, in the present specification, the coating die of the insulating liquid refers to a die body, or a die body including a discharge portion.

The present invention is characterized in preventing an inflow of air by forming a round-shaped bead on the tip portion of the insulating liquid discharged from the discharge portion by arranging the discharge portion at the lower end, which discharges the insulating liquid from the insulating liquid coating die, to be tilted at a predetermined angle toward the front region side.

Hereinafter, detailed embodiments of the present invention will be described with reference to the drawings.

First Embodiment

FIG. 3 is a diagram of an insulating liquid coating die according to a first embodiment of the present invention.

An insulating liquid coating die (die body) 200 receives an insulating liquid from an insulating liquid tank (not shown) and discharges the insulating liquid from the discharge portion of the front end toward the current collector 100 which is a coating member.

In the present embodiment, the insulating liquid coating die 200 is tilted toward the moving direction of the coating member, that is, the coating direction of the insulating liquid. The discharge portion 210 of the front end is also tilted toward the coating direction by the tilt of the insulating liquid coating die 200. FIG. 4 specifically shows an insulating liquid application process by the insulating liquid coating die 200 of FIG. 3.

FIG. 4 shows a discharge portion 210 formed on one surface (lower portion of the coating die) where the insulating liquid of the insulating liquid coating die 200 is discharged. The discharge portion 210 is formed of a first discharge portion 211 located at a front region side and a second discharge portion 212 located at a rear region side on the basis of the coating direction of the insulating liquid. An insulating liquid discharge path 201 is formed between the first discharge portion 211 and the second discharge portion 212, and an insulating liquid discharge port 202 is formed between the end 211a of the first discharge portion 211 and the end 212a of the second discharge portion 212. The discharge portion 210, that is, the first discharge portion 211 and the second discharge portion 212, is tilted at a predetermined angle toward the front region side with respect to the coating direction.

As illustrated in FIG. 4, when the first and second discharge portions 211 and 212 are tilted, a discharge liquid bead portion 310 of a round shape is formed at the lower portion of the end 211a of the first discharge portion 211. Namely, according to the present embodiment, the bead-shaped discharge liquid tip portion is formed in a direction opposite to the coating direction. When the bead portion 310 is formed, even if the insulating liquid 300 is moved in a direction in which the coating member is moved, an empty space is rarely formed, thereby preventing an inflow of air. Namely, even if the coating member is continuously moved to the right side (rear region side), the insulating liquid is continuously discharged from the upper portion of the tilted coating die 200, and the coating is continually performed while forming a bead shape, thereby preventing generation of an empty space as in FIG. 1.

As such, it is possible to effectively prevent an inflow of air to the insulating liquid coating layer.

Meanwhile, it is assumed that the discharge portion 210 or the insulating liquid coating die 200 is tilted toward the rear region side in the coating direction. In this case, though not illustrated, a bead is generated at the rear region side of the coating direction. Namely, a bead portion is formed near the lower portion of the second discharge portion 212. However, in this case, it is not possible to prevent generation of an empty space at the first discharge portion 211, and the lower portion of the first discharge portion has a shape which is not significantly different from that of FIG. 1. On the other hand, when the discharge portion 210 is made to be tilted toward the rear region side of the coating direction, the empty space of FIG. 1 may become larger. Hence, in the present invention, the discharge portion 210 was arranged to be tilted toward the front region side of the insulating liquid coating direction.

The tilt angle of the discharge portion 210 or the insulating liquid coating die 200 may be selected in a range where the bead portion 310 may be appropriately formed. If the discharge portion 210 is tilted by about 5 to 40 degrees toward the front region side of the insulating liquid coating direction on the basis of a direction perpendicular to the current collector 100, the bead portion 310 may be formed. In the case that the discharge portion 210 is tilted by an angle less than 5 degrees, even though the bead portion 310 is formed, an empty space may be formed, which may cause an inflow of air. If the discharge portion 210 is tilted by 40 or more degrees, it is difficult to adjust the discharge speed of the insulating liquid of a high viscosity, and an excessive insulating liquid portion may be formed at the front of the first discharge portion, which may make it difficult to determine an accurate insulating liquid coating point. Hence, the discharge portion 210 is preferably tilted by 5 to 40 degrees on the basis of the vertical direction of the current collector 100 in order to appropriately form the bead portion 310 and coat the insulating liquid 300 according to a predetermined design. The discharge portion 210 may be tilted more preferably by 9 to 20 degrees, and most preferably by 9 to 12 degrees.

A tilting tool or an angle-adjusting tool of the insulating liquid coating die 100 may be selected among known angle-adjusting tools. For example, it is possible to mount a foldable support leg on the insulating liquid coating die 100 as a hinge is coupled in the middle and adjusting the tilt angle of the insulating liquid coating die according to the folding angle of the support leg. Herein, when the support leg is folded, a predetermined stopper may be connected to the support leg to thereby adjusting an angle, and then the insulating liquid coating die may be set to a stopped state. However, this is only an example, and any form of mechanical or electronic angle-adjusting tool may be used if it can allow the insulating liquid coating die to be tilted toward the front region side in the coating direction.

Second Embodiment

FIG. 5 is a schematic diagram illustrating an insulating liquid application process according to a second embodiment of the present invention.

The cross-sectional shape of the second discharge portion 212, which is the discharge portion 210 at the rear region side in the coating direction of the insulating liquid, according to the present embodiment is different from that according to the first embodiment. The cross-section 212a of the second discharge portion according to the first embodiment is a straight line type surface, but the cross-section 212b of the second discharge portion 212 according to the second discharge portion is an inclined surface which is tilted toward the lower side from the end of the insulating liquid discharge port 202 of the second discharge portion 212.

Herein, such an inclined surface is formed so that the end of the second discharge portion 212 does not to interfere with the flow of the insulating liquid when the discharge portion 210 is tilted toward the current collector 100. Namely, as illustrated in FIG. 4, if the cross-section 212a of the second discharge portion 212 is a straight line type, when the insulating liquid 300 discharged from the discharge portion 202 is moved in the coating direction, the edge of the cross-section of the second discharge portion 212 may become an obstacle, thereby interfering with a smooth movement of the discharge liquid. Further, the cross-section 212a of the second discharge portion 212 is changed in its height toward the current collector 100 from a portion adjacent to the end of the discharge port of the second discharge portion 212, which may interfere with formation of a uniform coating thickness by pushing the insulating liquid coating layer 300.

Hence, in the present embodiment, when the discharge portion 210 is tilted, a smooth flow of the insulating liquid coating is promoted by forming the cross-section 212b of the second discharge portion as an inclined surface of a predetermined angle. As illustrated in FIG. 5, the tilt angle of the cross-section 212b of the second discharge portion 212 is preferably set so that the upper surface of the current collector 100 becomes parallel to the inclined surface in a state that the discharge portion 210 is tilted at a predetermined angle. In this angle, the thickness of the insulating liquid coating layer formed between the second discharge portion 212 and the upper surface of the current collector 100 may be made to be uniform.

FIG. 6 is a schematic diagram illustrating an insulating liquid application process according to a modified embodiment of a second embodiment.

In the present example, the cross-section 211b of the first discharge portion 211 at the front region side of the coating direction was formed as an inclined surface similarly to the cross-section of the second discharge portion 212. Namely, the cross-section 211b of the first discharge portion was configured so that an inclined surface, which is tilted toward the lower side from the end of the insulating liquid discharge port of the first discharge portion 211, may be formed. In such a form, the tip portion of the insulating liquid discharged from the discharge port 201 may be moved to the left side of the first discharge portion without being influenced by the end of the first discharge portion, thereby efficiently forming a bead portion 310. Herein, if the tilt angle of the cross-section 211b of the first discharge portion 211 is too large, a space may be generated between the insulating liquid and the first discharge portion 210. Hence, it is desirable to set the tilt angle not to be too large.

FIG. 7 is a schematic diagram illustrating an insulating liquid application process according to another modified embodiment of a second embodiment.

In FIG. 7, the cross-section 211c of the first discharge portion 211 is formed as an inclined surface which is tilted toward the upper side from the end of the discharge port of the first discharge portion 211 in contrast with FIG. 6. Namely, it is tilted in a direction which is similar to the tilt direction of the cross-section 211b of the second discharge portion. In such a form, the area by which the discharged insulating liquid contacts the end of the first discharge portion 211 becomes large, compared to the first discharge portion 211 illustrated in FIGS. 4 to 6. As such, the bead portion 310 of the tip portion of the insulating liquid may be formed as a greater area. Hence, a possibility that an empty space is formed on the lower portion of the first discharge portion 211 further decreases.

Further, the tilt angle of the inclined surface of the cross-section 211c of the first discharge portion and the tilt angle of the inclined surface of the cross-section of the second discharge portion 212b are preferably set to be parallel to the upper surface of the current collector, respectively, in a state that the discharge portion is tilted at a predetermined angle. Namely, as shown in dotted lines of the lower end of the discharge portion 210 of FIG. 7, in a state in that the discharge portion is tilted, if the cross-sections 211c and 212b of the first and second discharge portions are maintained parallel to the upper surface of the current collector 100, the flow of the insulating liquid 300 passing through the first and second discharge portions becomes smooth, and the coating thickness of the insulating liquid also becomes uniform.

Third Embodiment

FIG. 8 is a diagram of an insulating liquid coating die according to a third embodiment of the present invention.

The present embodiment is characterized in setting the width of the first discharge portion 211 to be different from the width of the second discharge portion 212. Namely, the width T1 of the first discharge portion 211 related to the formation of the bead portion 310 of the insulating liquid is set to be greater than the width T2 of the second discharge portion 212. In the third embodiment, as the area by which the first discharge portion 211 contacts the insulating liquid becomes large, the bead portion 310 of the tip portion of the insulating liquid becomes larger. As such, it is possible to more effectively prevent an inflow of air at a region near the first discharge portion 211.

In an existing example where the discharge portion 210 is arranged to be perpendicular to the current collector 100, if the width T1 of the first discharge portion 211 is greater than the width T2 of the second discharge portion 212 as in FIG. 8, the bead portion of the insulating liquid may be formed to be greater than the case where the width of the first discharge portion is the same as that of the second discharge portion. However, when the discharge portion was actually arranged vertically, the coating was unstable, and thus it was difficult to stably secure the coating quality.

However, in a state that the discharge portion 210 is tilted toward the front region side of the coating direction, if the width of the first discharge portion 211 is set to be large, the coating was stably performed. This seems to be because, in the case that the first discharge portion 211 is tilted, a wider fluid space of the insulating liquid discharged from the discharge portion 201 may be secured.

In the case of the third embodiment, namely, even when the width T1 of the first discharge portion 211 is greater than the width T2 of the second discharge portion 212, the shapes of the ends of the first discharge portion 211 and the second discharge portion 212 may be changed.

FIG. 8 shows an example (similar to the example of FIG. 7) that a downward inclined surface is formed on the cross-section 212b of the second discharge portion 212, and an upward inclined surface is formed on the cross-section 211c of the first discharge portion 211, but it is possible to form the end of the first discharge portion as a straight line type plane 211a which is not an inclined surface as shown by a dotted line at the lower portion of the first discharge portion 211.

Fourth Embodiment

FIG. 9 is a diagram of an insulating liquid coating die 200 according to a fourth embodiment of the present invention.

In the present embodiment, the first discharge portion 211 is formed to be longer than the second discharge portion 212, which is a difference.

Namely, it is to more efficiently form the bead portion 310 at the tip portion of the insulating liquid by increasing the area or time in which the insulating liquid contacts the first discharge portion 211 similarly to the third embodiment by making the length L1 of the first discharge portion 211 to be greater than the length L2 of the second discharge portion 212.

For example, in a conventional example where the discharge portion 210 is arranged in a position perpendicular to the current collector 100, in the case the length of the first discharge portion 211 was set to be greater than the length of the second discharge portion 212 as in FIG. 9, the coating was not appropriately performed, or the coating quality was very unstable. This seems to be because the fluidity of the insulating liquid of a high viscosity becomes unstable as the flow of the insulating liquid is blocked by the first discharge portion 211.

However, in a state where the discharge portion 21 was tilted toward the front region side of the coating direction, if the length L1 of the front region side 211 is set to be long as in FIG. 9, a large fluid space of the insulating liquid 300 discharged from the discharge portion 202 could be secured, and thus the coating was possible.

In the present embodiment, it is possible to change the shapes of ends of the first discharge portion 211 and the second discharge portion 212.

In FIG. 9, a downward inclined surface is formed on the cross-section 212b of the second discharge portion 212, and the cross-section 211a of the first discharge portion 211 is formed as a straight line plane which is not an inclined surface (namely, an example similar to FIG. 5), but it is possible to use a discharge portion including an end of another form.

In various embodiments, the end shapes, widths and lengths of the first discharge portion and the second discharge portion may be determined in consideration of the tilt angle by which the discharge portion is tilted. For example, when the discharge portion is tilted too much, the width and the length of the first discharge portion may be set to be longer. However, even when referring to the tilt angle of the discharge portion, it is important to decide the end shape, length, and width of the first and second discharge portions within an appropriate range in which the mixing of air may be prevented while most efficiently coating the insulating liquid.

A specific method of coating the insulating liquid using the insulating liquid coating die of the present invention will be described with reference to the drawing.

The insulating liquid is used to insulate the electrode. Hence, in order to coat the insulating liquid, the electrode slurry should be coated on the current collector in advance. Namely, an electrode is manufactured in the order of electrode coating—insulating liquid coating—drying by heat.

In order to consecutively perform electrode coating and insulating liquid coating, the electrode slurry coating die (not shown) is arranged at the front region side of the electrode current collector, and the insulating liquid coating die 200 is arranged at the rear region side with a certain interval.

Since the coating of the electrode slurry does not correspond to the main point of the present invention, the specific description thereof is omitted here. The electrode slurry, which is generated by mixing an electrode active material, a conductive material, and a binder, etc., is discharged on the current collector 100 from the electrode slurry coating die, and the coating of the electrode slurry is performed.

The insulating liquid coating die 200 is arranged at the rear region of the electrode slurry coating die so that the discharge portion 210 of the front end is to be tilted at a predetermined angle toward the front region side of the coating direction of the insulating liquid.

If the electrode current collector 100 is moved from the front region to the rear region, the electrode slurry is coated on the current collector 100 from the electrode slurry coating die. Thereafter, when the current collector, on which the electrode slurry is coated, is moved to the lower portion of the insulating liquid coating die 200, the insulating liquid is discharged from the insulating liquid coating die 200. At this time, as shown in FIG. 2, the insulating liquid is coated along the interface between the coated portion and the non-coated portion of the electrode slurry on the current collector.

Further, the insulating liquid is coated by being overlaid on a part of the coated portion of the electrode slurry (see portion "B" of FIG. 2).

Since the discharge portion 210 is tilted toward the front region side of the coating direction of the insulating liquid, an insulating liquid bead portion 31 is effectively formed on the lower portion of the first discharge portion 211, thereby preventing an inflow of air as illustrated in FIGS. 4 to 5.

Alternatively, as illustrated in FIGS. 5 to 9, the insulating liquid bead portion may be effectively formed by following the tilt angle of the discharge portion by changing the width and/or length of the first and second discharge portions 211 and 212 or making the cross-sectional shape of the first discharge portion 211 or the second discharge portion 212 as an inclined surface.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

100: current collector
110: electrode (active material layer)
111: flat coating surface
112: inclined portion
200: insulating liquid coating die (die body)
210: discharge portion
211: first discharge portion
211a: cross-section
211b: cross-section (downward inclined surface)
211c: cross-section (upward inclined surface)
212: second discharge portion
212a: cross-section
212b: cross-section (downward inclined surface)
300: insulating liquid
310: bead portion

The invention claimed is:

1. A die for coating an insulating liquid, the die comprising:
a die body configured to be positioned on a current collector to discharge an insulating liquid; and
a discharge portion formed at one surface of the die body, the discharge portion configured to receive a discharge of the insulating liquid therethrough, the discharge portion forming a discharge path and a discharge port where the insulating liquid is discharged,
wherein the discharge portion includes a first discharge portion positioned at a front side of a coating direction of the insulating liquid, and a second discharge portion positioned at a rear side of the coating direction of the insulating liquid, the discharge path is formed between the first discharge portion and the second discharge portion, and the discharge port is formed between an end of the first discharge portion and an end of the second discharge portion, and
wherein the die body is configured to be tilted at a predetermined angle toward the front side of the coating direction of the insulating liquid, so that the discharge portion of the die body is also tilted at a predetermined angle toward the front side of the coating direction of the insulating liquid,
wherein a cross-section of the second discharge portion forms an inclined surface which is tilted downwards from an end of the discharge port.

2. The die of claim 1, wherein a tilt angle of the inclined surface of the cross-section of the second discharge portion is configured such that an upper surface of the current collector is parallel to the inclined surface when the discharge portion is tilted at the predetermined angle.

3. The die of claim 1, wherein a cross-section of the first discharge portion forms an inclined surface which is tilted downwards from an end of the discharge port.

4. The die of claim 1, wherein a cross-section of the first discharge portion forms an inclined surface which is tilted upwards from an end of the discharge port.

5. The die of claim 4, wherein a tilt angle of the inclined surface of the cross-section of the first discharge portion and a tilt angle of the inclined surface of the cross-section of the second discharge portion are configured to be parallel to the upper surface of the current collector, respectively, when the discharge portion is tilted at the predetermined angle.

6. The die of claim 1, wherein a width of the first discharge portion is greater than a width of the second discharge portion.

7. The die of claim 1, wherein a length of the first discharge portion is greater than a length of the second discharge portion.

8. The die of claim 1, wherein the discharge portion is configured to be tilted by 5 to 40 degrees toward the front side of the coating direction of the insulating liquid with respect to a direction perpendicular to the current collector.

9. A method of using the die of claim 1 for coating the insulating liquid on an electrode active material layer formed on a current collector, the die being an insulating liquid die, the method comprising:
arranging an electrode slurry coating die at a front side of the current collector in a coating direction of the insulating liquid of the current collector;
arranging the insulating liquid coating die at a rear side of the electrode slurry coating die so that the discharge portion, in which the insulating liquid of the insulating liquid coating die is discharged, is tilted at the predetermined angle toward the front side of the current collector; and
coating the insulating liquid by moving the current collector toward the coating direction of the insulating liquid,
wherein as the current collector is moved, the insulating liquid is continuously coated by the insulating liquid coating die at regular intervals after a process of coating the electrode slurry onto the current collector by the electrode slurry coating die at the front side of the insulating liquid coating die.

10. The method of claim 9, wherein the insulating liquid is coated along an interface between a coated portion and a non-coated portion of the electrode slurry on the current collector.

11. The method of claim 9,
wherein the insulating liquid is discharged and coated by the discharge portion in which the cross-section of the second discharge portion forms the inclined surface which is tilted downwards from an end of the insulating liquid discharge port.

12. The method of claim 9, wherein the insulating liquid is discharged through the discharge portion of the insulating liquid coating die, and a width of the first discharge portion is greater than a width of the second discharge portion.

13. The method of claim 9, wherein the insulating liquid is discharged through the discharge portion, in which a length of the first discharge portion is greater than a length of the second discharge portion.

* * * * *